United States Patent
Sonobe

(10) Patent No.: US 9,052,654 B2
(45) Date of Patent: Jun. 9, 2015

(54) POLYAMIC ACID COMPOSITION, POLYIMIDE ENDLESS BELT, AND IMAGE FORMING APPARATUS

(75) Inventor: Kenya Sonobe, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 1292 days.

(21) Appl. No.: 12/401,894

(22) Filed: Mar. 11, 2009

(65) Prior Publication Data

US 2010/0078596 A1   Apr. 1, 2010

(30) Foreign Application Priority Data

Sep. 26, 2008   (JP) ................. 2008-247987

(51) Int. Cl.
| | |
|---|---|
| C08G 69/26 | (2006.01) |
| G03G 15/20 | (2006.01) |
| C08G 73/10 | (2006.01) |
| C08L 79/08 | (2006.01) |

(52) U.S. Cl.
CPC ........ *G03G 15/2057* (2013.01); *C08G 73/1067* (2013.01); *C08G 73/1071* (2013.01); *C08L 79/08* (2013.01); *G03G 2215/2016* (2013.01)

(58) Field of Classification Search
USPC ........... 399/284, 286, 265; 252/500; 528/353, 528/332, 335, 342, 347, 348; 525/436
See application file for complete search history.

(56) References Cited

U.S. PATENT DOCUMENTS

| | | | |
|---|---|---|---|
| 5,268,446 A | 12/1993 | Tamai et al. | |
| 5,286,840 A * | 2/1994 | Oikawa et al. | 528/353 |
| 6,139,784 A | 10/2000 | Oshima et al. | |
| 6,668,148 B2 * | 12/2003 | Hirano et al. | 399/284 |
| 2004/0024107 A1 * | 2/2004 | Nojiri et al. | 524/495 |
| 2008/0138120 A1 * | 6/2008 | Miyamoto | 399/302 |
| 2008/0302334 A1 | 12/2008 | Kotou et al. | |
| 2009/0236566 A1 | 9/2009 | Nishiura et al. | |
| 2009/0248227 A1 | 10/2009 | Kotou et al. | |
| 2009/0253316 A1 | 10/2009 | Kotou et al. | |

FOREIGN PATENT DOCUMENTS

| | | |
|---|---|---|
| JP | A-5-5033 | 1/1993 |
| JP | A-05-077252 | 3/1993 |
| JP | A-05-170905 | 7/1993 |
| JP | A-07-198929 | 8/1995 |
| JP | A-09-272739 | 10/1997 |
| JP | A-9-328618 | 12/1997 |
| JP | A-10-063115 | 3/1998 |
| JP | A-11-237638 | 8/1999 |
| JP | A-2000-063518 | 2/2000 |
| JP | A-2004-068002 | 3/2004 |
| JP | A-2004-123857 | 4/2004 |
| JP | A-2005-68227 | 3/2005 |
| JP | A-2006-29100 | 2/2006 |
| JP | A-2007-140055 | 6/2007 |
| JP | A-2007-333904 | 12/2007 |
| WO | WO 2008/035647 A1 | 3/2008 |

OTHER PUBLICATIONS

Chevron Phillips, Acetylene Black spec sheet, http://www.matweb.com/search/datasheet_print.aspx?matguid=2684ebe357824814b83551bfb3bdc434.*
Notice of Reasons for Rejection dated Dec. 21, 2010 in corresponding Japanese Patent Application No. 2008-247987 (with translation).

* cited by examiner

*Primary Examiner* — Monique Peets
(74) *Attorney, Agent, or Firm* — Oliff PLC

(57) ABSTRACT

A polyamic acid composition includes a conductive carbon black and a polyamic acid in which a diamine compound, a tetracarboxylic acid dianhydride, and an acid monoanhydride have been reacted at a quantitative ratio satisfying the following Relational Expression (1) and Relational Expression (2). In Relational Expressions (1) and (2), X represents a content by mol of the diamine compound, Y represents a content by mol of the tetracarboxylic acid dianhydride, and Z represents a content by mol of the acid monoanhydride.

$0.962 \leq Y/X \leq 0.997$   Relational Expression (1)

$0.20 \leq Z/2(X-Y) < 0.80$.   Relational Expression (2)

11 Claims, 3 Drawing Sheets

POLYAMIC ACID COMPOSITION, POLYIMIDE ENDLESS BELT, AND IMAGE FORMING APPARATUS

CROSS-REFERENCE TO RELATED APPLICATION

This application is based on and claims priority under 35 USC 119 from Japanese patent Application No. 2008-247987 filed on Sep. 26, 2008.

BACKGROUND

1. Technical Field

The present invention relates to a polyamic acid composition, a polyimide endless belt, and an image forming apparatus.

2. Related Art

In an image forming apparatus of an electrophotographic system, an electrical charge is generated on an image holder which is a photoconductive photoreceptor containing an inorganic or organic material, an electrostatic latent image is formed by, for example, a laser beam according to a modulated image signal, and the electrostatic latent image is developed with an electrically charged toner so as to form a visual toner image. Then, a desired reproduction image is obtained by electrostatically transferring the toner image to a recording medium, such as a recording paper, directly or via an intermediate transfer member. In particular, an image forming apparatus is known which adopts a system in which a toner image formed on an image holder is transferred to an intermediate transfer member (primary transfer), and the toner image is further transferred from the intermediate transfer member to a recording paper (secondary transfer).

Materials for use in image forming apparatuses of the intermediate transfer member system include a conductive endless belt containing a thermoplastic resin (such as polycarbonate resin or PVDF (polyvinylidene fluoride)) and an elastic belt containing a reinforcing material having a woven fabric, such as polyester, and an elastic member disposed in layers.

SUMMARY

According to an aspect of the invention, there is provided a polyamic acid composition containing:

a conductive carbon black; and a polyamic acid in which a diamine compound, a tetracarboxylic acid dianhydride, and an acid monoanhydride have been reacted at a quantitative ratio satisfying the following Relational Expression (1) and Relational Expression (2):

$$0.962 \leq Y/X \leq 0.997 \quad \text{Relational Expression (1)}$$

$$0.20 \leq Z/2(X-Y) < 0.80 \quad \text{Relational Expression (2)}$$

wherein, in Relational Expressions (1) and (2), X represents a content by mol of the diamine compound, Y represents a content by mol of the tetracarboxylic acid dianhydride, and Z represents a content by mol of the acid monoanhydride.

BRIEF DESCRIPTION OF THE DRAWINGS

Exemplary embodiments of the present invention will be described in detail based on the following figures, wherein.

DETAILED DESCRIPTION

Figure 1:
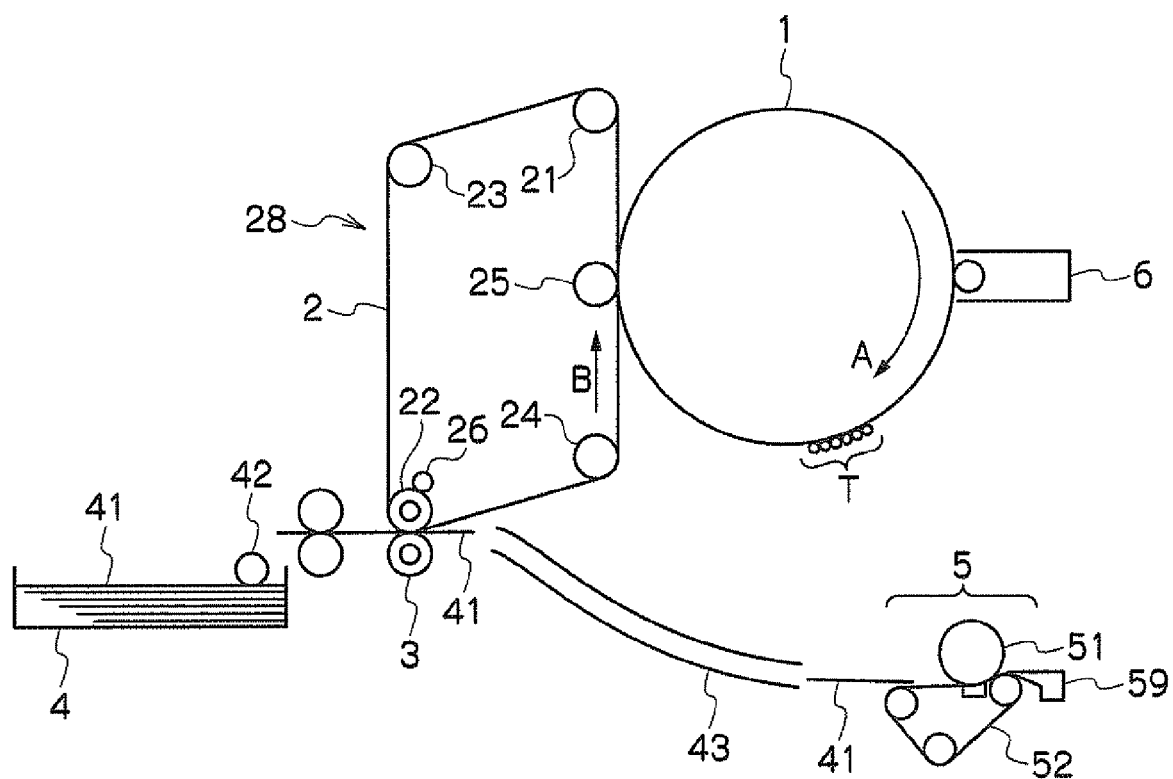
FIG. 1 is a schematic configuration diagram illustrating an image forming apparatus according to a third exemplary embodiment in which polyimide endless belts are used as an intermediate transfer belt and a fusing belt.

Hereinafter, exemplary embodiments will be described in more detail.

<First Exemplary Embodiment:Polyamic Acid Composition>

A polyamic acid composition according to the first exemplary embodiment contains: a polyamic acid in which a diamine compound, a tetracarboxylic acid dianhydride, and an acid monoanhydride have been reacted at a quantitative ratio satisfying Relational Expression (1) and Relational Expression (2);

$$0.962 \leq Y/X \leq 0.997 \quad \text{Relational Expression (1)}$$

$$0.20 \leq Z/2(X-Y) < 0.80, \text{ and} \quad \text{Relational Expression (2)}$$

a conductive carbon black.

In Relational Expressions (1) and (2), X represents the content by mol of the diamine compound, Y represents the content by mol of the tetracarboxylic acid dianhydride, and Z represents the content by mol of the acid monoanhydride.

Conventionally, when the conductive carbon black is contained in a polyamic acid composition, there have been problems in that viscosity increases over time and chemical stability and thermal stability are poor. As a result, ease in operation sometimes remarkably lowers when subjected to a subsequent processing, for example an application process for belt production. When a polyimide endless belt is produced using the polyamic acid composition, there have been a problem in that the strength, especially folding endurance, of the belt decreases.

In contrast, the polyamic acid composition according to the first exemplary embodiment addresses the above-described problems, and contains the conductive carbon black and the polyamic acid in which ingredients have been reacted at a quantitative ratio satisfying Relational expression (1) and Relational expression (2).

Although the mechanism with which the above-described problems are solved is not very clear, it is supposed to be as described below.

First, the acid monoanhydride is a substance which functions as an terminal blocking agent that blocks an amino terminal group which can serve as a polymerization chain terminal of a polyamic acid obtained by polymerizing the diamine compound and the tetracarboxylic acid dianhydride. Accordingly, it is considered that, in the polyamic acid in which the ingredients have been reacted at a quantitative ratio satisfying Relational Expression (1) and Relational Expression (2), amino terminal groups present at polymerization chain terminals are blocked in a proportion of 20% or more but less than 80%. Here, it is considered that, when the quantitative ratio is in the above-mentioned range (i.e., $0.20 \leq Z/2(X-Y) < 0.80$), the amino terminal groups present at the polymerization chain terminals of the polyamic acid react with a surface of the conductive carbon black to form a favorable interface layer.

Next, each component for use in the polyamic acid composition according to the first exemplary embodiment will be described in detail.

Polyamic Acid

The polyamic acid for use in the polyamic acid composition according to the first exemplary embodiment is not particularly limited insofar as it is obtained by a reaction of raw materials in the above-mentioned quantitative ratio. A known polyamic acid may be used. The main molecular skeleton of a polyamic acid can be represented by Formula (I), for example.

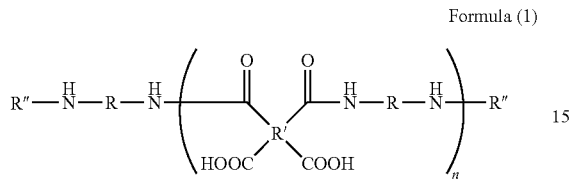

Formula (1)

In Formula (1), R represents a divalent aromatic residue or a divalent aliphatic residue, R' represents a tetravalent aromatic residue or a tetravalent aliphatic residue, n represents a positive number, R" represents a terminal of a molecule, and is selected from hydrogen or an organic group formed by the acid monoanhydride, and the organic group except the hydrogen satisfies the relationship, $0.20 \leq Z/2(X-Y) < 0.80$.

More specifically, examples of R include the following:

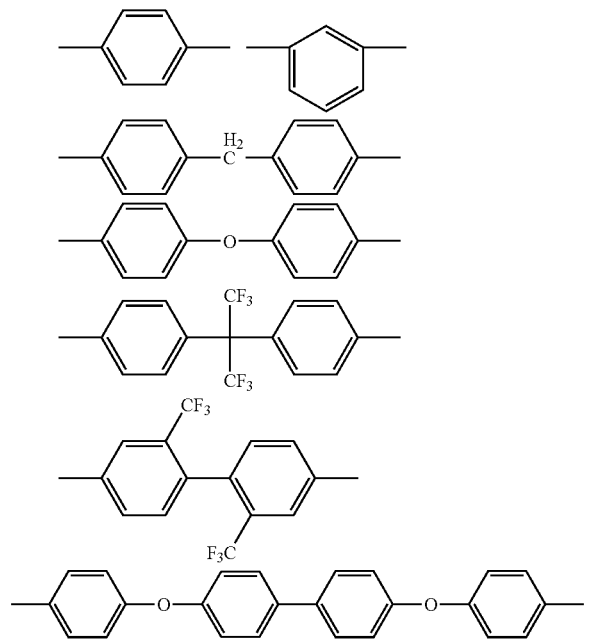

Examples o R' include the following:

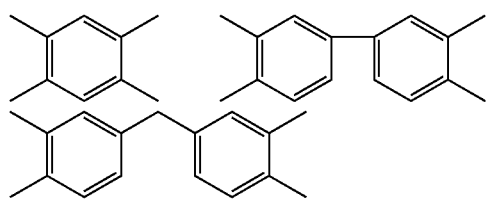

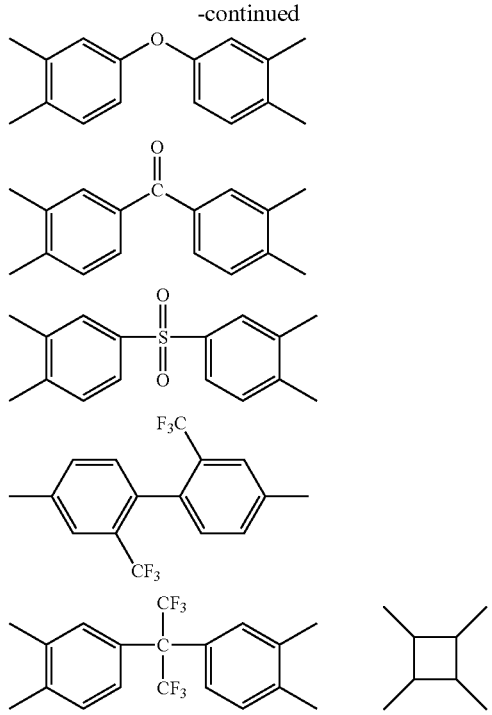

Examples of R" include, in addition to hydrogen, the following:

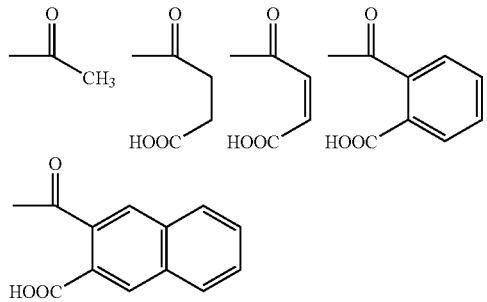

The scope of R" also include a known structure in which some of the hydrogen atoms of any of the above aromatic residues or aliphatic residues are substituted with a substituent such as an alkyl group or a hydroxyl group. These structures may be used singly or in combination of two or more thereof.

Examples of the structure of a polyimide obtained using the polyamic acid composition according to the first exemplary embodiment, which is preferable from the viewpoints of mechanical properties and manufacturing cost, include the following:

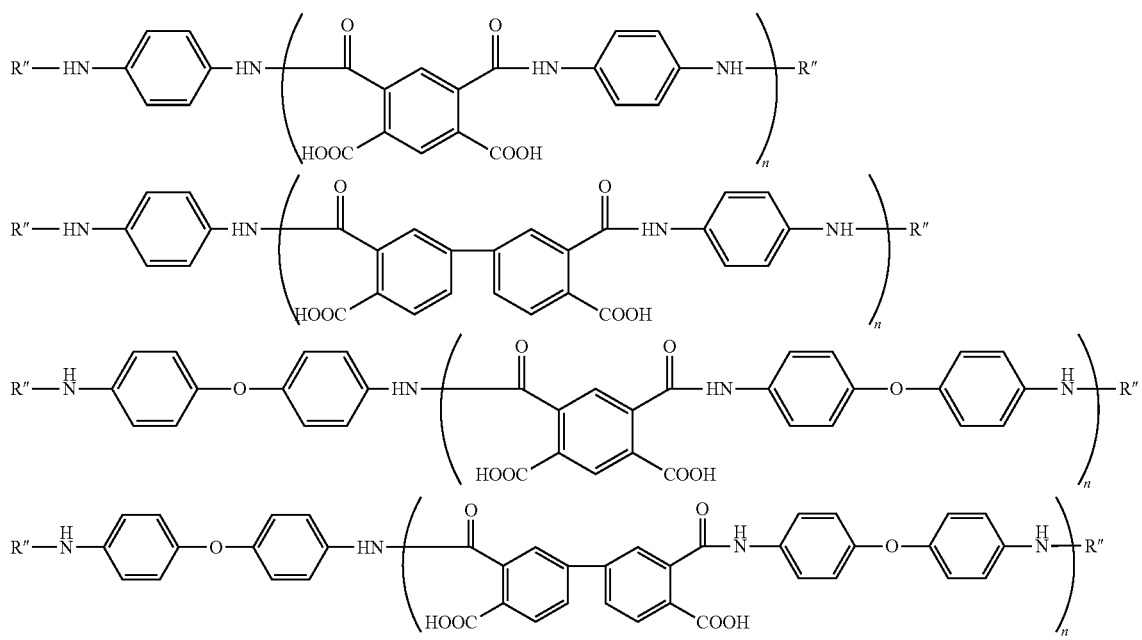

A method of analyzing the structure of the polyamic acid will be described.

First, methanol is added to a solution of a polyamic acid composition to reprecipitate the polyamic acid. The reprecipitated matter is put in a pressure-proof bottle. Then, a 1N aqueous sodium hydroxide solution is added, and the resultant is treated at 100° C. for 2 hours to obtain a hydrolysate of the polyamic acid. Next, the hydrolysate is subjected to extraction using chloroform. Then, a concentrate of the chloroform phase is analyzed by infrared spectroscopy, nuclear magnetic resonance spectroscopy, and a gas chromatography method to identify the structure and the amount of the diamine component (derived from the diamine compound). Separately, the aqueous phase, which is a chloroform-insoluble phase of the above hydrolysate, is neutralized, and freeze-dried to obtain a dry solid substance. The dry solid substance is subjected to extraction using methanol. Then, the dissolved substance is analyzed by infrared spectroscopy, nuclear magnetic resonance spectroscopy, and a gas chromatography method to thereby identify the structure and the amount of the carboxylic acid component (derived from the tetracarboxylic acid dianhydride and the acid monoanhydride).

The analysis method described above is used to determine whether or not polyamic acids described in the present specification satisfy Relational Expression (1) and Relational Expression (2).

A polyamic acid used in the first exemplary embodiment has an imidization ratio obtained by the following IR method of preferably from 0.0% to 25.0%, more preferably from 0.0% to 15.0%, and most preferably from 0.0% to 10.0%, from the viewpoints of improved processability in a subsequent application process and improved appearance of a formed polyimide film.

The imidization ratio according to the IR method is measured by the following method. All of the imidization ratio values described in this specification are the values measured by the following method.

1) When a polyamic acid is dissolved in an organic solvent such as N-methylpyrrolidone, a glass or a fluororesin base material is dipped in the solution or spin-coated with the solution, so as to obtain a film (a) having a thickness of about 10-odd microns.
2) The film (a) is immersed in a solvent that is a poor solvent against the polyamic acid and that has a boiling point of lower than 100° C., such as THF (tetrahydrofuran), at 25±5° C. for 3 minutes to remove the organic solvent and deposit the polyamic acid, thereby obtaining a film (b).
3) The film (b) is dried at a temperature of 25±5° C. for 15 minutes by vacuum drying (−0.08 MPa), and then the film of the polyamic acid is separated from the base material to obtain a measurement sample film (c).
4) The film (c) is measured by permeametry using an IR apparatus (FT-730, manufactured by Horiba, Ltd.).
5) As a standard sample having an imidization ratio of 100%, a sample (d) is prepared by calcinating the film (c) for 2 hours at a temperature that is equal to or higher than Tg of a corresponding polyimide, and then the sample is similarly subjected to the IR measurement.
6) The imidization ratio is calculated according to the following Equation (3).

Imidization ratio (%)=<Absorption peak intensity derived from an imide ring in film (c)/Absorption peak intensity derived from an aromatic ring as an internal standard in film (c)>/<

<Absorption peak intensity derived from the imide ring in film (d)/Absorption peak intensity derived from the aromatic ring as an internal standard in film (d)>×100(%)  Equation (3)

When the polyamic acid is in the form of a solid, the imidization ratio can be determined by similar measurement using KBr powder.

In general, it is said that, in polyamic acid, dehydration between an amide bond site and a carboxyl group therein, which is an imidization reaction, sequentially occurs. When the imidization reaction occurs, an imide closed-ring structure is formed and impedes the movement of molecules. As a result, it is expected that the fluidity as a solution decreases. In the polyamic acid composition according to the first exemplary embodiment, the imidization ratio is adjusted to the above-mentioned preferable range, whereby the fluidity and processability of the polyamic acid may be improved and a polyimide film having a favorable appearance may be obtained.

In general, an imidization reaction of polyamic acid very rapidly proceeds with heat or the like, which makes it difficult to measure a true imidization ratio of the polyamic acid itself. In contrast, the above-described method of measuring an imidization ratio of polyamic acid is a superior method addressing such difficulty.

The molecular weight of the polyamic acid of the first exemplary embodiment is not particularly limited. In Formula (I), n is preferably from 1 to 1,000, more preferably from 10 to 500, and most preferably from 30 to 300.

The unit number n of the polyamic acid can be determined by:

obtaining the weight average molecular weight of the polyamic acid by the GPC method described below;

calculating the molecular weight per unit by summing up the molecular weight per mol of the tetracarboxylic acid dianhydride as a raw material for the polyamic acid and the molecular weight per mol of the diamine as another raw material for the polyamic acid; and dividing the weight average molecular weight of the polyamic acid by the total molecular weight per unit.

As an example of the GPC (Gel Permeation Chromatography) method, measurement is performed using HLS-8120GPC (Column: TSKgel series) manufactured by TOSOH CORP. as an instrument and N-methylpyrrolidone (to which 1 mM lithium bromide and 1 mM phosphoric acid have been added) as an eluent. The polyamic acid is chemically unstable, and care should be taken to avoid decrease in the molecular weight due to a depolymerization reaction, which occurs depending on conditions. Therefore, also in GPC, the processes from sample preparation to measurement may be carried out within about 5 hours.

Diamine Compound

The diamine compound used in the first exemplary embodiment is not particularly limited and a known diamine compound may be used insofar as the diamine compound has two amino groups in its molecular structure and can be used for polymerization of a polyamic acid. Examples of the diamine compound include aromatic diamines, such as p-phenylenediamine, m-phenylenediamine, 4,4'-diaminodiphenylmethane, 4,4'-diaminodiphenylethane, 4,4'-diaminodiphenyl ether, 4,4'-diaminodiphenyl sulfide, 4,4'-diaminodiphenyl sulfone, 1,5-diaminonaphthalene, 3,3-dimethyl-4,4'-diaminobiphenyl, 5-amino-1-(4'-aminophenyl)-1,3,3-trimethyl indan, 6-amino-1-(4'-aminophenyl)-1,3,3-trimethyl indan, 4,4'-diaminobenzanilide, 3,5-diamino-3'-trifluoromethyl benzanilide, 3,5-diamino-4'-trifluoromethyl benzanilide, 3,4'-diaminodiphenyl ether, 2,7-diaminofluorene, 2,2-bis(4-aminophenyl)hexafluoropropane, 4,4'-methylene-bis(2-chloroaniline), 2,2,5,5'-tetrachloro-4,4'-diaminobiphenyl, 2,2'-dichloro-4,4'-diamino-5,5'-dimethoxybiphenyl, 3,3'-dimethoxy-4,4'-diaminobiphenyl, 4,4'-diamino-2,2'-bis(trifluoromethyl)biphenyl, 2,2-bis[(4-(4-aminophenoxy)phenyl)]propane, 2,2-bis[(4-(4-aminophenoxy) phenyl)]hexafluoropropane, 1,4-bis(4-aminophenoxy)benzene, 4,4'-bis(4-aminophenoxy)-biphenyl, 1,3'-bis(4-aminophenoxy)benzene, 9,9-bis(4-aminophenyl) fluorene, 4,4'-(p-phenyleneisopropylidene)bisaniline, 4,4'-(m-phenyleneisopropylidene)bisaniline, 2,2'-bis[(4-(4-amino-2-trifluoromethylphenoxy)phenyl)] hexafluoropropane, and 4,4'-bis[4-(4-amino-2-trifluoromethyl)phenoxy]-octafluorobiphenyl; aromatic diamines each of which has (i) two amino groups bonded to an aromatic ring or aromatic rings and (ii) a hetero atom other than nitrogen atoms of the amino groups, such as diaminotetraphenylthiophene; aliphatic diamines and alicyclic diamines, such as 1,1-meta-xylylenediamine, 1,3-propanediamine, tetramethylenediamine, pentamethylenediamine, octamethylenediamine, nonamethylenediamine, 4,4-diaminoheptamethylenediamine, 1,4-diaminocyclohexane, isophoronediamine, tetrahydrodicyclopentadienylenediamine, hexahydro-4,7-methanoindanylenedimethylenediamine, tricyclo [6.2.1.0$^{2,7}$]-undecylenedimethydiamine, and 4,4'-methylenebis(cyclohexylamine). These diamine compounds may be used singly or in combination of two or more thereof.

As the diamine compound, p-phenylenediamine, 4,4'-diaminodiphenylmethane, 4,4'-diaminodiphenyl ether, 4,4'-diaminodiphenyl sulfide, or 4,4'-diaminodiphenyl sulfone is preferably used, and p-phenylenediamine or 4,4'-diaminodiphenyl ether is more preferably used.

Tetracarboxylic Acid Dianhydride

The tetracarboxylic acid dianhydride used in the first exemplary embodiment is not particularly limited, and a known tetracarboxylic acid dianhydride may be used insofar as it is a compound used for polymerization of a polyamic acid. Examples of the tetracarboxylic acid dianhydride include pyromellitic acid dianhydride, 3,3',4,4'-benzophenone tetracarboxylic acid dianhydride, 3,3',4,4'-biphenylsulfone tetracarboxylic acid dianhydride, 1,4,5,8-naphthalene tetracarboxylic acid dianhydride, 2,3,6,7-naphthalene tetracarboxylic acid dianhydride, 3,3',4,4'-biphenyl ether tetracarboxylic acid dianhydride, 3,3',4,4-dimethyldiphenylsilane tetracarboxylic acid dianhydride, 3,3', 4,4'-tetraphenylsilane tetracarboxylic acid dianhydride, 1,2,3,4-furan tetracarboxylic acid dianhydride, 4,4'-bis(3,4-dicarboxyphenoxy)diphenyl sulfide dianhydride, 4,4'-bis(3,4-dicarboxyphenoxy)diphenylsulfone dianhydride, 4,4'-bis(3,4-dicarboxyphenoxy)diphenylpropane dianhydride, 3,3',4,4'-perfluoroisopropylidene diphthalic acid dianhydride, 3,3',4,4'-biphenyl tetracarboxylic acid dianhydride, bis(phthalic acid)phenylphosphine oxide dianhydride, p-phenylene-bis(triphenylphthalic acid) dianhydride, m-phenylene-bis(triphenylphthalic acid) dianhydride, bis(triphenylphthalic acid)-4,4'-diphenyl ether dianhydride, and bis(triphenylphthalic acid)-4,4'-diphenylmethane dianhydride.

Examples of aliphatic tetracarboxylic acid dianhydrides include aliphatic or alicyclic tetracarboxylic acid dianhydrides, such as butane tetracarboxylic acid dianhydride, 1,2,3,4-cyclobutane tetracarboxylic acid dianhydride, 1,3-dimethyl-1,2,3,4-cyclobutanetetracarboxylic acid dianhydride, 1,2,3,4-cyclopentane tetracarboxylic acid dianhydride, 2,3,5-tricarboxycyclopentyl acetic acid dianhydride, 3,5,6-tricarboxynorbornane-2-acetic acid dianhydride, 2,3,4,5-tetrahydrofuran tetracarboxylic acid dianhydride, 5-(2,5-dioxotetrahydrofuranyl)-3-methyl-3-cyclohexene-1,2-dicarboxylic acid dianhydride, and bicyclo[2.2.2]-oct-7-ene-2,3,5,6-tetracarboxylic acid dianhydride; aliphatic tetracarboxylic acid dianhydrides having an aromatic ring, such as 1,3,3a,4,5,9b-hexahydro-2,5-dioxo-3-furanyl-naphtho[1,2-c]furan-1,3-dione, 1,3,3a,4,5,9b-hexahydro-5-methyl-5-(tetrahydro-2,5-dioxo-3-furanyl)-naphtho-[1,2-c]furan-1,3-dione, and 1,3,3a,4,5,9b-hexahydro-8-methyl-5-(tetrahydro-2,5-dioxo-3-furanyl)-naphtho[1,2-c]furan 1,3-dione. These tetracarboxylic acid dianhydrides may be used singly or in combination of two or more thereof.

The tetracarboxylic acid dianhydride is preferably an aromatic tetracarboxylic acid dianhydride, more preferably pyromellitic dianhydride, 3,3',4,4'-benzophenone tetracarboxylic acid dianhydride, or 3,3',4,4'-biphenyl sulfone tetracarboxylic acid dianhydride, and still more preferably pyromellitic dianhydride or 3,3,4,4'-benzophenone tetracarboxylic acid dianhydride.

Acid Monoanhydride

The acid monoanhydride used in the first exemplary embodiment is not particularly limited, and a known acid monoanhydride may be used insofar as it reacts with an amine. Examples of the acid monoanhydride include acetic anhydride, maleic anhydride, phthalic anhydride, 2,3-benzophenone dicarboxylic acid anhydride, 3,4-benzophenone dicarboxylic acid anhydride, 2,3-dicarboxyphenyl phenyl ether anhydride, 3,4-dicarboxyphenyl phenyl ether anhydride, 2,3-biphenyl dicarboxylic acid anhydride, 3,4-biphenyl dicarboxylic acid anhydride, 2,3-dicarboxyphenyl phenyl sulfone anhydride, 3,4-dicarboxyphenyl phenyl sulfone anhydride, 2,3-dicarboxyphenyl phenyl sulfide anhydride, 3,4-dicarboxyphenyl phenyl sulfide anhydride, 1,2-naphthalene dicarboxylic acid anhydride, 2,3-naphthalene dicarboxylic acid anhydride, 1,8-naphthalene dicarboxylic acid anhydride, 1,2-anthracene dicarboxylic acid anhydride, 2,3-anthracene dicarboxylic acid anhydride, and 1,9-anthracene dicarboxylic acid anhydride. The structure of each of these acid monoanhydrides may be partially substituted within a range in which the substituent does not have reactivity with an amine or a carboxylic acid anhydride. These acid monoanhydrides may be used singly or in combination of two or more thereof.

The acid monoanhydride is preferably maleic anhydride and/or phthalic anhydride.

The polyamic acid used in the first exemplary embodiment is obtained by polymerizing the diamine compound, the tetracarboxylic acid dianhydride, and the acid monoanhydride at a quantitative ratio satisfying Relational Expression (1) and Relational Expression (2):

$$0.962 \leq Y/X \leq 0.997 \quad \text{Relational Expression (1)}$$

$$0.20 \leq Z/2(X-Y) < 0.80 \quad \text{Relational Expression (2)}$$

wherein, in Relational Expressions (1) and (2), X represents the content (mol) of the diamine compound, Y represents the content (mol) of the tetracarboxylic acid dianhydride, and Z represents the content (mol) of acid monoanhydride.

Here, X, Y, and Z above specify the molecular structure of the polyamic acid, and further the molecular weight is also specified thereby. Y/X preferably satisfies "$0.965 \leq Y/X \leq 0.997$", and more preferably "$0.970 \leq Y/X \leq 0.995$". $Z/2(X-Y)$ preferably satisfies "$0.30 \leq Z/2(X-Y) \leq 0.70$", more preferably "$0.35 \leq Z/2(X-Y) \leq 0.65$", and most preferably "$0.40 \leq Z/2(X-Y) \leq 0.60$".

Polymerization Method for Forming Polyamic Acid

The polymerization method for forming the polyamic acid used in the first exemplary embodiment is not particularly limited, and may be a known method. Examples of the polymerization method include:

A melting method including mixing the diamine compound, the tetracarboxylic acid dianhydride, and the acid monoanhydride so as to satisfy Relational Expression (1) and Relational Expression (2), and performing polymerization at high temperature in the absence of solvent;

A solution method including mixing the diamine compound, the tetracarboxylic acid dianhydride, and the acid monoanhydride so as to satisfy Relational Expression (1) and Relational Expression (2), and further adding a solvent and performing polymerization; and A diester dicarboxylic acid method including first treating the tetracarboxylic acid dianhydride with alcohol to form diester dicarboxylic acid, and then performing polymerization.

The solution method using a solvent is preferable.

The solvent may be a known organic polar solvent. Specific examples thereof include sulfoxide solvents, such as dimethyl sulfoxide and diethylsulfoxide; formamide solvents, such as N,N-dimethylformamide and N,N-diethylformamide; acetamide solvents, such as N,N-dimethylacetamide and N,N-diethylacetamide; pyrrolidone solvents, such as N-methyl-2-pyrrolidone and N-vinyl-2-pyrrolidone; phenol solvents, such as phenol, o-, m-, or p-cresol, xylenol, halogenated phenol, and catechol; ether solvents, such as tetrahydrofuran, dioxane, and dioxolane; alcohol solvents, such as methanol, ethanol, and butanol; cellosolve solvents, such as butyl cellosolve; hexamethylphosphoramide; and γ-butyrolactone.

The method of adding the diamine compound, the tetracarboxylic acid dianhydride, and the acid monoanhydride to a solvent, and performing polymerization is not particularly limited. Examples of the method include:

1) Single-stage method: X mol of the diamine compound, Y mol of the tetracarboxylic acid dianhydride, and Z mol of the acid monoanhydride are added to a solvent, and the mixture is polymerized;
2) Multistage method: X mol of the diamine compound is dissolved in a solvent, and then Y mol of the tetracarboxylic acid dianhydride and Z mol of the acid monoanhydride are gradually added in several stages;
3) Blending method: In a first batch, X/2 mol of the diamine compound is dissolved in a solvent, Y/2 mol of the tetracarboxylic acid dianhydride is mixed, and the mixture is polymerized. In a second batch, X/2 mol of the diamine compound is dissolved in a solvent, Y/2 of the tetracarboxylic acid dianhydride and Z mol of the acid monoanhydride are mixed, and the mixture is polymerized. Finally, the first batch and the second batch are blended and mixed.

More specifically, any method may be used insofar as the quantitative ratio relationships defined in Relational Expression (1) and Relational Expression (2) are satisfied. For example, any of the above methods may be used singly or any combination of two or more thereof may be used.

The polymerization conditions in the above solution method are not limited. The reaction temperature is preferably 30° C. or higher but lower than 80° C., more preferably 40° C. or higher but lower than 70° C., and most preferably 50° C. or higher but lower than 65° C. The polymerization time may be set such that the polymerization reaction sufficiently proceeds. The degree of polymerization can be confirmed by measuring the molecular weight or the molecular weight distribution by a GPC (Gel Permeation Chromatography) method, or, more simply, can be estimated based on the time when the increase in viscosity of the solution stops. For example, in the first exemplary embodiment above, the polymerization time may be from several hours to about 48 hours.

The solid content of the polyamic acid is not particularly limited, and is preferably from 5 mass % to 50 mass %, and more preferably from 10 mass % to 30 mass %.

Conductive Carbon Black

The conductive carbon black used in the first exemplary embodiment is not particularly limited, and may be a known conductive carbon black. Examples of the conductive carbon black include carbon powder, Ketjenblack, acetylene black, furnace black, channel black, single-walled carbon nanotube, multi-walled carbon nanotube, and fullerene. The conductive carbon black may be used singly or in combination of two or more thereof. The conductive carbon black is preferably an acid carbon black having a pH of 7 or lower, more preferably an acid carbon black having a pH of 5 or lower, and still more preferably an acid carbon black having a pH of 4 or lower. The pH of the acid carbon black can be determined by preparing an aqueous suspension of the carbon black and measuring the pH with a glass electrode.

The acid carbon black can be produced by oxidizing a carbon black to provide the surface of the carbon black with a carboxyl group, a quinone group, a lactone group, a hydroxyl group, or the like. The oxidation treatment may be performed by an air oxidation method in which the carbon black is brought into contact with air in a high temperature atmosphere for reaction, a method in which the carbon black is allowed to react with a nitrogen oxide or ozone at normal temperature, or a method in which the carbon black is oxidized with air at high temperature and then oxidized with ozone at low temperature.

More specifically, the acid carbon black can be produced by a contact method. Examples of the contact method include a channel method and a gas black method. Moreover, the acid carbon black can also be produced by a furnace black method using a gas or an oil as a raw material. After such a treatment is conducted, liquid phase acid treatment may be performed with, for example, nitric acid. The acid carbon black is more preferably produced by a closed furnace method. In general, only a carbon black having a high pH and a low volatile content is produced by the furnace method. However, the pH of the carbon black can be adjusted by subjecting the carbon black to the liquid phase acid treatment. Therefore, the carbon black used in the exemplary embodiment may be an acid carbon black prepared by subjecting a carbon black obtained by the furnace method to a post-process in which the pH is adjusted to 5 or lower.

The pH of the acid carbon black can be adjusted by conditions of the oxidation treatment, such as the oxidation temperature and the oxidation time. The amount of the volatile component in the oxidation-treated carbon black is preferably from 1.0 mass % to 25.0 mass %, more preferably from 2.0 mass % to 20.0 mass %, and particularly preferably from 3.5 mass % to 15.0 mass %. The proportion of the volatile component can be determined by the proportion of an organic volatile component (a carboxyl group, a hydroxyl group, a quinone group, and a lactone group, etc.) which evaporates when the carbon black is heated at 950° C. for 7 minutes.

Specific examples of the acid carbon black include "PRINTEX 150T" (pH 4.5, volatile component content=10.0 mass %) manufactured by Degussa AG, "SPECIAL BLACK 350" (pH 3.5, volatile component content=2.2 mass %) manufactured by Degussa AG, "SPECIAL BLACK 100" (pH 3.3, volatile component content=2.2 mass %) manufactured by Degussa AG, "SPECIAL BLACK 250" (pH 3.1, volatile component content=2.0 mass %) manufactured by Degussa AG, "SPECIAL BLACK 5" (pH 3.0, volatile component content=15.0 mass %) manufactured by Degussa AG, "SPECIAL BLACK 4" (pH 3.0, volatile component content=14.0 mass %) manufactured by Degussa AG, "SPECIAL BLACK 4A" (pH 3.0, volatile component content=14.0 mass %) manufactured by Degussa AG, "SPECIAL BLACK 550" (pH 2.8, volatile component content=2.5 mass %) manufactured by Degussa AG, "SPECIAL BLACK 6" (pH 2.5, volatile component content=18.0 mass %) manufactured by Degussa AG, "COLOR BLACK FW200" (pH 2.5, volatile component content 20.0 mass %) manufactured by Degussa AG, "COLOR BLACK FW2" (pH 2.5, volatile component content=16.5 mass %) manufactured by Degussa AG, "COLOR BLACK FW2V" (pH 2.5, volatile component content=16.5 mass %) manufactured by Degussa AG, "MONARCH1000" (pH 2.5, volatile component content=9.5 mass %) manufactured by Cabot Corp., "MONARCH1300" (pH 2.5, volatile component content=9.5 mass %) manufactured by Cabot Corp., "MONARCH1400" (pH 2.5, volatile component content=9.0 mass %) manufactured by Cabot Corp., "MOGUL-L" (pH 2.5, volatile component content=5.0 mass %) manufactured by Cabot Corp., and "REGAL400R" (pH 4.0, volatile component content=3.5 mass %) manufactured by Cabot Corp.

Production of Polyamic Acid Composition

The polyamic acid composition according to the first exemplary embodiment contains the polyamic acid and the conductive carbon black described above. The method of mixing the polyamic acid and the conductive carbon is not particularly limited, and may be a known method. An example of the method is a method including crushing aggregation of the conductive carbon black by shearing force, impact, or collision, for example according to a stirring method, an ultrasonic irradiation method, a ball mill method, or a jet mill method, and distributing the conductive carbon black to the polyamic acid such that the conductive carbon black is dispersed in the polyamic acid. These methods may be used singly or in combination of two or more thereof.

More specific examples thereof include a method including adding the conductive carbon black before polymerization for forming the polyamic acid and allowing the polymerization for forming the polyamic acid to proceed in the presence of the conductive carbon black whereby the conductive carbon black is dispersed, and a method including mixing the conductive carbon black and a solution of the polyamic acid obtained by polymerization. These methods may be used singly or in combination of two or more thereof.

An example of the method is a master batch method that includes first mixing the conductive carbon black and a part of the polyamic acid so as to disperse the conductive carbon black and then adding the remainder of the polyamic acid. In this method, the polyamic acid to be used first may have a low molecular weight. The low-molecular-weight polyamic acid may be a polyamic acid satisfying Relational Expression (1) and Relational Expression (2).

In the polyamic acid composition according to the first exemplary embodiment, the amount of the conductive carbon black with respect to 100 parts by mass of the polyamic acid is preferably from 1 part by mass to 100 parts by mass, more preferably from 5 parts by mass to 80 parts by mass, still more preferably from 15 parts by mass to 60 parts by mass, and further preferably from 20 parts by mass to 40 parts by mass.

To the polyamic acid composition according to the first exemplary embodiment, various known additives and fillers may be added insofar as the objects are not impaired. Examples thereof include a silicone defoaming agent; a conductive substance other than conductive carbon black, such as titanium oxide or zinc oxide; an inorganic compound such as metal powder; a fatty acid ester antistatic agent; a high-molecular-weight conductive compound, such as polyaniline; and glass fiber, mica, talc, calcium carbonate, silica, PTFE, or silicone rubber as a reinforcing material, a sliding material, a heat conductive material, or an elasticity imparting material.

<Second Exemplary Embodiment: Polyimide Endless Belt>

A polyimide endless belt according to the second exemplary embodiment is obtained by applying the polyamic acid composition according to the first exemplary embodiment to a surface of a cylindrical base material (metal mold), and converting the polyamic acid to imide by, for example, subjecting the polyamic acid composition applied to the surface of the cylindrical base material to heat treatment.

An example of the production method is described below. First, the polyamic acid composition according to the first exemplary embodiment is applied to a surface of a cylindrical base material. The cylindrical base material may be a cylindrical metal mold. In place of the metal mold, a mold formed of a conventional raw material, such as a resin, glass, or ceramic, may favorably serve as a base material. Moreover, a glass coating or a ceramic coating may be provided on the surface of the base material, and a silicone release agent or a fluorine release agent may be applied to the surface of the base material.

A surplus solution may be eliminated and the variation in thickness of the solution on the cylindrical base material may be reduced by moving a thickness-controlling substrate in the axis direction of the cylindrical base material while maintaining a previously-adjusted clearance between the cylindrical base material and the thickness-controlling substrate. When the variation in thickness of the solution is suppressed when the solution is applied to the cylindrical base material, it is not necessary to use the thickness-controlling substrate.

The surface of the cylindrical base material on which the polyamic acid composition is coated may be either the inner surface of the cylindrical base material or the outer surface of the cylindrical base material. When the polyamic acid composition is applied to the inner surface of the cylindrical base material, the thickness-controlling substrate may be passed through the hole of the cylindrical base material. When the polyamic acid composition is applied to the outer surface of the cylindrical base material, the cylindrical base material may be passed through a hole provided at the thickness-controlling substrate.

Examples of the coating solvent used when the polyamic acid composition according to the first exemplary embodiment is applied to the surface of the cylindrical base material include sulfoxide solvents, such as dimethyl sulfoxide and diethylsulfoxide; formamide solvents, such as N,N dimethylformamide and N,N-diethylformamide; acetamide solvents, such as N,N-dimethylacetamide and N,N-diethylacetamide; pyrrolidone solvents, such as N-methyl-2-pyrrolidone and N-vinyl-2-pyrrolidone; phenol solvents, such as phenol, o-, m- or p-cresol, xylenol, halogenated phenol, and catechol; ether solvents, such as tetrahydrofuran, dioxane, and dioxolane; alcohol solvents, such as methanol, ethanol, and butanol; cellosolve solvents, such as butyl cellosolve; hexamethylphosphoramide; and γ-butyrolactone. The solvent may be used singly or in combination of two or more thereof as a mixture. Furthermore, an aromatic hydrocarbon, such as xylene or toluene, is also usable. The solvent is not particularly limited insofar as the solvent dissolves a polyamic acid and a polyamic acid-polyimide copolymer.

The coating solvent may be the same solvent as that used in the synthesis of the polyamic acid according to the first exemplary embodiment. Alternatively, the solvent used in the synthesis of the polyamic acid may be substituted with a desired coating solvent after polymerization for forming the polyamic acid. The solvent substitution may be performed by any of the following methods: a method including adding a given amount of solvent to a polyamic acid solution for dilution; a method including re-precipitating a polymer and re-dissolving the polymer in a desired solvent; and a method including adding a desired solvent while gradually distilling off the previous solvent so as to adjust the composition.

Next, the cylindrical base material to which the polyamic acid composition has been applied is placed in a heated environment so as to be dried for evaporating the solvent contained therein such that preferably 20 mass % or more (more preferably 60 mass % or more) of the solvent evaporates. However, the solvent may remain in the film as long as the coating film surface is dried and the solvent does not flow even when the coating film is inclined. The drying temperature may be from 50° C. to 200° C.

After completion of drying, the polyamic acid composition is subjected to conversion to an imide. The conversion to an imide may be performed fully by heating the cylindrical base material, to which the polyamic acid composition has been applied, at a given temperature. The heating temperature during the process may be equal to or higher than the glass transition temperature of the polyimide to be obtained. The heating temperature varies depending on the types of the tetracarboxylic acid dianhydride and the diamine as raw materials, and may be set to a temperature at which the imidization completes, i.e., a temperature that is equal to or higher than the glass transition temperature of the polyimide to be obtained. For example, the heating temperature may be from 60° C. to 400° C., and preferably from 100° C. to 350° C.

The conversion to an imide may alternatively be performed by the following chemical imidization. A method of the chemical imidization includes adding a dehydrating agent and/or a catalyst to a polyamic acid composition to thereby chemically advance an imidization reaction. The dehydrating agent is not particularly limited insofar as it is a monovalent carboxylic acid anhydride. For example, one selected from the following or two or more selected from the following may be used: acid anhydrides such as acetic anhydride, propionic anhydride, trifluoroacetic anhydride, butanoic anhydride, and oxalic anhydride. The amount of the dehydrating agent to be used may be from 0.01 mol to 2 mol per mol of the repeating unit of the polyamic acid.

Examples of the catalyst include, but are not limited to, one selected from the following or a combination of two or more selected from the following: tertiary amines such as pyridine, picoline, collidine, lutidine, quinoline, isoquinoline, and triethylamine. The amount of the catalyst to be used may be from 0.01 mol to 2 mol per mol of the dehydrating agent to be used.

The chemical imidization may be performed by adding a dehydrating agent and/or a catalyst to a polyamic acid solution, and optionally heating as required. The reaction temperature of dehydration cyclization is generally from 0° C. to 180° C., and preferably from 60° C. to 150° C.

The dehydrating agent and/or the catalyst that has been allowed to act on the polyamic acid does not have to be removed; when they are removed, the removal may be performed by any of the following methods. As a method of removing the added dehydrating agent and/or the catalyst, heating under reduced pressure, re-precipitation, or the like may be used. Heating under reduced pressure may be performed under vacuum at a temperature of from 80° C. to 120° C., whereby, for example, a tertiary amine used as a catalyst an unreacted dehydrating agent, and a carboxylic acid as a hydrolysis product are distilled off. The re-precipitation may be performed using a poor solvent that dissolves a catalyst, an unreacted dehydrating agent, and a carboxylic acid as a hydrolysis product but does dissolve the polyamic acid-polyimide copolymer; specifically, the reaction liquid is added to large excess of a poor solvent so as to cause re-precipitation. The poor solvent is not particularly limited, and may be selected from water, an alcohols solvent such as methanol or ethanol, a ketone solvent such as acetone or methyl ethyl ketone, or a hydrocarbon solvent such as hexane. The precipitated polyamic acid-polyimide copolymer may be separated by filtration, and then dissolved again in a solvent such as γ-butyrolactone or N-methyl-2-pyrrolidone.

Thereafter, the resin is removed from the cylindrical base material, thereby providing a desired polyimide endless belt.

Although a production method of a polyimide endless belt according to the second exemplary embodiment is described above, the scope of the invention is not limited only to the exemplary embodiments, and various improvements, alterations and modifications may be added based on the knowledge of those skilled in the art within the range not departing from the gist of the invention. The belt is not necessarily removed from the cylindrical base material, and, when the belt is not removed from the cylindrical base material, the cylindrical base material having the belt thereon may be used as a roll.

<Third Exemplary Embodiment: Image Forming Apparatus>

An image forming apparatus according to the third exemplary embodiment is provided with one or more endless belts in which at least one of the one or more endless belts is the polyimide endless belt according to the second exemplary embodiment. The polyimide endless belt according to the second exemplary embodiment may be used in various applications such as an intermediate transfer belt, a transfer conveyance belt, a conveyance belt, and a fusing belt in image forming apparatuses using an electrophotographic system such as an electrophotographic copying machine, a laser beam printer, a facsimile, or a multi-function apparatus having two or more functions of the above apparatuses.

As a structure of the image forming apparatus according to the third exemplary embodiment, known structures may be used insofar as one or more endless belts are mounted thereon. For example, the image forming apparatus may include an image holder, a charging unit that charges a surface of the image holder, an exposure unit that exposes the surface of the image holder to light so as to form an electrostatic latent image, a developing unit that develops the electrostatic latent image formed on the surface of the image holder with a developer to form a toner image, a transfer unit that transfers the toner image formed on the surface of the image holder to a recording medium, a fusing unit that fuses the toner image transferred to the surface of the recording medium, and a cleaning unit that removes adhered matters, such as toner or dirt, adhering to the surface of the image holder after the toner image has been transferred to the recording medium. As required, the image forming apparatus may further include one or more other known units.

In the following, the image forming apparatus according to the third exemplary embodiment is described in more detail with reference to an example thereof.

FIG. 1 is a schematic configuration diagram illustrating an image forming apparatus provided with an intermediate transfer device and a fusing device. The image forming apparatus is provided with an intermediate transfer belt 2 and a fusing belt 52, each of which is the polyimide endless belt described above.

The image forming apparatus includes an image holder (photoreceptor) 1 which is a support for a toner image, a developing device 6 that supplies toner to the image holder 1, an intermediate transfer belt 2 that transfers the toner on the image holder 1 from a primary transfer position to a secondary transfer position by rotation thereof, a conductive roll 25 which is a transfer electrode for transferring the toner on the image holder 1 to the intermediate transfer belt 2 at the primary transfer position, a bias roll 3 which is a transfer electrode disposed at the secondary transfer position at the front surface side of the intermediate transfer belt 2 on which the toner image has been held, a back-up roll 22 disposed to face the bias roll 3 with the intermediate transfer belt 2 interposed therebetween, an electrode roll 26 which rotates in pressure contact with the back-up roll 22, support rolls 21, 23, and 24 that support the intermediate transfer belt 2 to guide the rotation of the intermediate transfer belt 2, a recording medium 41, a recording-medium storing unit 4 that supplies the recording medium 41, a supply roll 42 that supplies the recording medium 41 from the recording-medium storing unit 4, a conveyance path 43 which is a path along which the recording medium 41 to which the toner image has been transferred is conveyed, and a fusing device 5 provided with a fusing belt 52. The intermediate transfer belt 2 is stretched by the back-up roll 22 and the support rolls 21, 23, and 24 to form a belt stretching device 28.

The operation of this image forming apparatus is described below. The image holder 1 rotates in the direction of arrow A, and a surface thereof is charged with a charging device (not shown). The charged image holder 1 is irradiated with a laser beam emitted from an image writing device (not shown) to form an electrostatic latent image.

The electrostatic latent image is visualized with the toner supplied by the developing device 6 to form a toner image T. The toner image T is conveyed, owing to the rotation of the image holder 1, to the primary transfer position at which the conductive roll 25 is disposed, and then a voltage having a polarity opposite to that of the electrical charge of the toner of the toner image T is applied by the conductive roll 25, whereby the toner image T is electrostatically adsorbed to the intermediate transfer belt 2. Since the intermediate transfer belt 2 moves in the direction of arrow B and is in contact with the surface of the image holder 1 at the primary transfer position, the toner image T on the image holder 1 is successively adsorbed to the intermediate transfer belt 2 as the intermediate transfer belt 2 moves, whereby primary transfer of the toner image T is performed. The toner image transferred to the intermediate transfer belt 2 is conveyed, owing to the rotation of the intermediate transfer belt 2, to the secondary transfer position at which the bias roll 3 is disposed.

The recording medium 41 is supplied at a given timing, by the supply roll 42, from the recording-medium storing unit 4 to an area at which the intermediate transfer belt 2 contacts the bias roll 3 at the secondary transfer position. A voltage having a polarity which is the same as that of the toner image is applied from the electrode roll 26 via the back-up roll 22 while the intermediate transfer belt 2 carrying the toner image thereon is pressed directly against the recording medium 41 at the secondary transfer position by the bias roll 3 and the back-up roll 22, whereby the toner image is adsorbed to the recording medium 41. The intermediate transfer belt 2 moves with the recording medium 41 at the secondary transfer position so as to rotate in the direction of arrow B. Therefore, the toner image on the intermediate transfer belt 2 is successively adsorbed to the recording medium 41 with the movement, whereby secondary transfer is performed.

The recording medium 41 having the transferred toner image is conveyed to the fusing device 5 through a conveyance path 43. As described below in detail with reference to FIG. 2, the toner image on the recording medium 41 is pressurized/heat-treated by the fusing device 5 to be fixed onto the recording medium 41.

Figure 2:
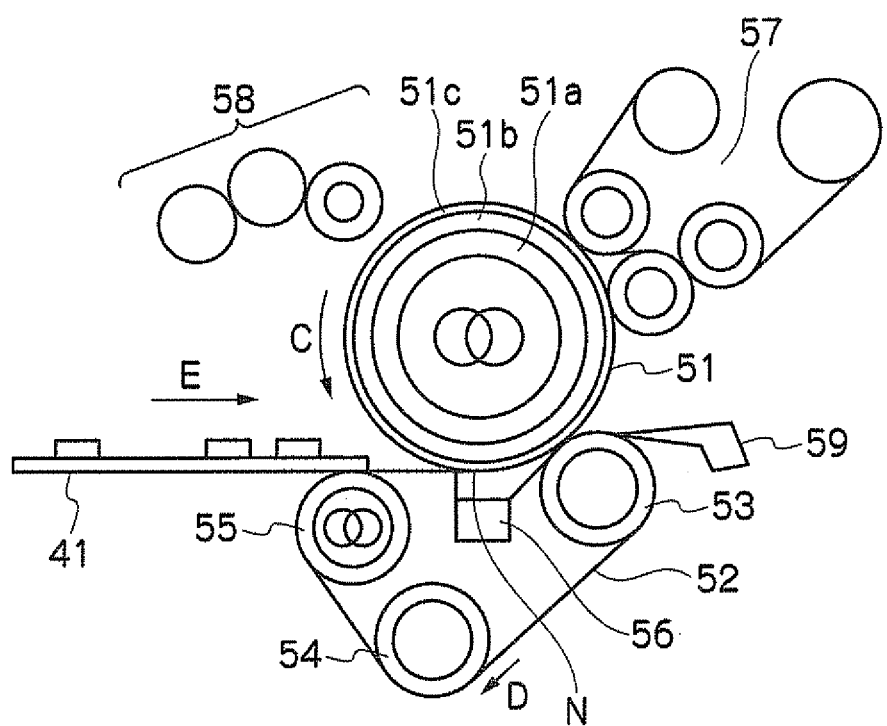
FIG. 2 is an enlarged schematic configuration diagram illustrating a fusing device of the image forming apparatus according to the third exemplary embodiment shown in FIG. 1.

FIG. 2 is an enlarged schematic configuration diagram illustrating the fusing device of the image forming apparatus illustrated in FIG. 1.

The fusing device 5 includes a fusing roll 51 that is configured by a hollow roll 51a having a heating source inside (e.g., an aluminum hollow roll having a halogen lamp inside as a heating source), an elastic layer 51b (e.g., an elastic layer obtained by providing a liquid silicone rubber on a surface of the hollow roll 51a and curing the silicone rubber) and a heat-resistant and oil-resistant mold-release layer 51c (e.g., a heat-resistant and oil-resistant mold-release layer obtained by applying a fluororubber to the surface of the elastic layer 51b). The fusing roll 51 is driven to rotate in the direction of arrow C. The fusing device 5 further includes a fusing belt 52 which is rotated in the direction of arrow D by rotating the fusing roll 51, a pressurizing pad 56 (e.g., a pressurizing pad obtained by integrally molding silicone rubber with a metal base material) which presses the fusing belt 52 against the fusing roll 51 so as to cause pressure-contact between the fusing belt 52 and the fusing roll 51 and so as to form a contact area N having a broad contact width, a first support roll 54 that supports the fusing belt 52, a second support roll 55 which is disposed at the upstream side of the contact area N with respect to the rotation direction of the fusing belt 52 and which supports the fusing belt 52 and has a heating unit that preheats the fusing belt 52, a pressure roll 53 which is disposed at the downstream side of the contact area N with respect to the rotation direction of the fusing belt 52 which supports the fusing belt 52, and a sheet separating pawl 59 that separates the recording medium 41, which has passed the contact area N, from the fusing roll 52. A part of the fusing belt 52 at which the fusing belt 52 contacts the contact area N is stretched by the second support roll 55 and the pressure roll 53. The pressure roll 53 is pressed toward the center of the fusing roll 51 by a coil spring (not shown).

Moreover, the fusing device 5 includes a cleaning unit 57 which contacts the fusing roll 51 to wipe off the toner remaining on the surface of the fusing roll 51 and a release agent coating unit 58 which contacts the fusing roll 51 at the upstream side of the fusing contact portion and applies a release agent.

The operation of the fusing device 5 will be described below.

The recording medium 41 having an unfixed toner on a surface thereof is conveyed to the second support roll 55 of the fusing belt 52 via the conveyance path 43 of FIG. 1. The recording medium 41 as well as the unfixed toner are preheated by the second support roll 55. The fusing belt 2 has a part extending horizontally from the second support roll 55 to the contact area N, and the recording medium 41 is conveyed in the direction of arrow E to the contact area N by the horizontally-extending part. When the recording medium 41 having the unfixed toner image attached thereto passes the contact area N, the fusing roll 51 heats and pressurizes the unfixed toner image, whereby the unfixed toner image is fixed onto the recording medium 41. Since a release agent has been applied to the fusing roll 51 by the release agent coating unit 58, the unfixed toner image is efficiently fixed to the recording medium 41. Even when there is a toner adhering to the surface of the fusing roll 51 rather than being fixed to the recording medium 41, the toner is wiped off by the cleaning unit 57. After the recording medium 41 to which the toner is fixed passes the contact area N, the recording medium 41 is conveyed to the position of the sheet separating pawl 59, separated from the fusing belt 52 by the sheet separating pawl 59, and then discharged to a discharge unit (not shown) disposed downstream side of the fusing device 5.

Figure 3:
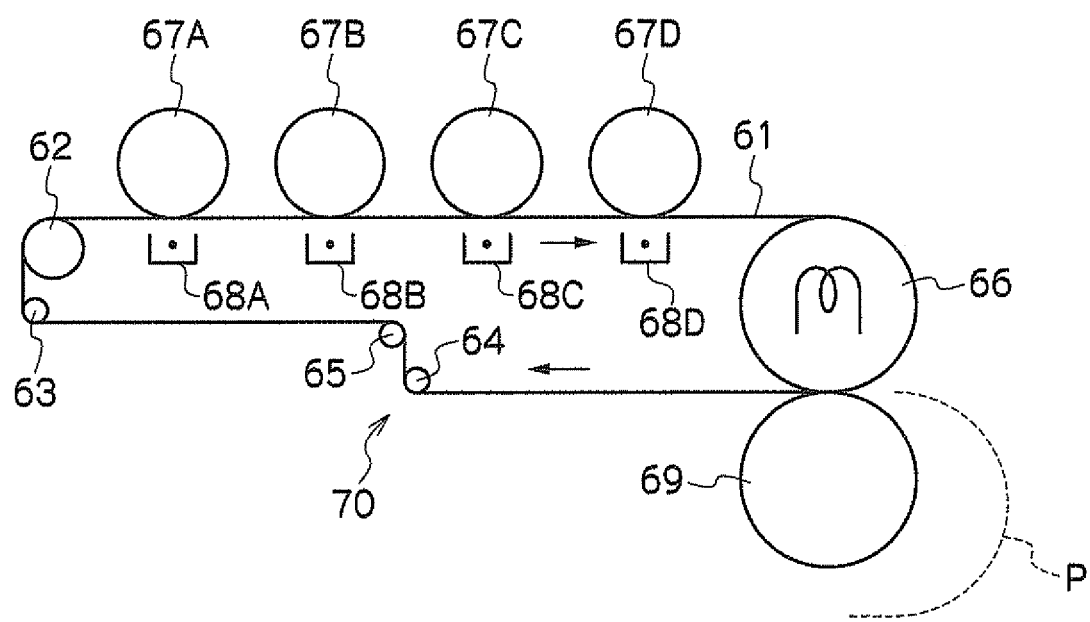
FIG. 3 is a schematic configuration diagram illustrating the image forming apparatus according to the third exemplary embodiment in which the polyimide endless belt is used as an intermediate transfer fusing belt.

FIG. 3 is a schematic configuration diagram of an image forming apparatus having an intermediate transfer fusing device. The image forming apparatus includes an intermediate transfer fusing belt 61 having functions of both the intermediate transfer belt and the fusing belt. The intermediate transfer fusing belt 61 is the polyimide endless belt described above.

In the image forming apparatus, the intermediate transfer fusing belt 61 is stretched by a driving roll 62, guide rolls 63 and 64, a tension roll 65, and a heating roller 66 to form a belt stretching apparatus 70. In a portion of the intermediate transfer fusing belt 61 that is stretched by the driving roll 62 and the heating roller 66, four photoreceptor drums 67A, 67B, 67C, and 67D, on which toner images of respectively different colors are formed, are provided to contact the intermediate transfer fusing belt 61; and transfer units 68A, 68B, 68C, and 68D are disposed to oppose the four photoreceptor drums, 67A, 67B, 67C, and 67D, respectively. The pressurizing roller 69 is in pressure-contact with the heating roller 66.

In the above-described structure, the toner images of respectively different colors undergo primary transfer from the four photoreceptor drums 67A, 67B, 67C, and 67D to the intermediate transfer fusing belt 61. Then, a recording medium P is sent to between the heating roller 66 and the pressurizing roller 69. Thus, a multicolor toner image on the intermediate transfer fusing belt 61 undergoes secondary transfer onto the recording medium P and is thermally fixed.

EXAMPLES

Hereinafter, the present invention will be described in more detail with reference to examples, but is not limited to the examples. The evaluations indicated in the production examples, examples, and comparative examples described below are performed by the following methods.

(1) Measurement of Viscosity of Polyamic Acid and a Solution of Polyamic Acid Composition Measurement is performed at a measurement temperature of 25° C. using a TV-20 viscometer (cone plate type) manufactured by Toki Sangyo Co., Ltd.

(2) Measurement of Imidization Ratio of Polyamic Acid

Measurement is performed by the above-described method.

(3) Method of Dispersing Conductive Carbon Black in Polyamic Acid Solution

A given amount (amounts shown in Tables 4 to 8) of conductive carbon black is added to a polyamic acid solution. Thereafter, the solution is dispersed using a collision-type disperser GEANUS PY manufactured by Genus Co., Ltd.; specifically, the pressure is 200 MPa, the smallest cross-sectional area at collision part is 0.032 mm$^2$, the solution is divided to two flow paths and allowed to collide with each other, and the solution after collision is divided again to two flow paths. To the passage, a mechanism which circulates a temperature-controlled cooling medium is provided, and the liquid temperature before introduction is controlled so as not to exceed 40° C. and the liquid temperature after collision is controlled so as not to exceed 120° C. The time required for dispersion is 3 hours.

(4) Method of Preparing Polyimide Endless Belt

An SUS cylindrical metal mold having an outer diameter of 90 mm and a length of 450 mm is prepared. Then, a silicone release agent is applied to the outer surface of the metal mold, and then dried (release agent treatment). While the cylindrical metal mold which has been subjected to the metal release agent treatment is rotated in the circumferential direction at a rate of 10 rpm, a solution of a polyamic acid composition is applied onto the metal mold with a uniform pressure applied to the applied solution by a metal blade disposed on the metal mold; the application of the solution is performed by discharging the solution from a dispenser having an opening diameter of 1.0 mm, and the solution of a polyamic acid composition is spirally applied onto the cylindrical metal mold by moving the dispenser unit in the axial direction of the cylindrical metal mold at a rate of 100 mm/minute. After the application of the solution, the blade is removed, and the cylindrical metal mold is rotated continuously for 2 minutes for leveling.

Thereafter, the metal mold and the coating are dried in a drying furnace at 150° C. for 1 hour in the atmospheric air while rotated at 10 rpm. After drying, the resultant is calcined in a clean oven at 320° C. for 6 hours to advance an imidization reaction. Thereafter, the metal mold is cooled to 25° C., and resin is taken out of the metal mold to obtain a desired polyimide endless belt.

The following substances are used as raw materials for use in the following production examples, examples, and comparative examples.

Polymerization solvent: N-methyl-2-pyrrolidone (hereinafter abbreviated as NMP)
Diamine compound: 4,4'-diaminodiphenyl ether (hereinafter abbreviated as ODA)
Tetracarboxylic acid dianhydride: 3,3',4,4'-biphenyl tetracarboxylic acid dianhydride (hereinafter abbreviated as BPDA)
Acid monoanhydride: phthalic anhydride (hereinafter abbreviated as PA)
Conductive carbon black: SPECIAL BLACK4 (manufactured by Degussa, pH: 4.0, volatile component content: 14.0%, hereinafter abbreviated as SB4)
Conductive carbon black: Ketjenblack EC300J (manufactured by Lion Corporation, pH: 9.0, volatile component content: 0.5%, hereinafter abbreviated as EC)

Production Example A1

In a 1 L separable flask, 82.72 g (0.413 mol) of ODA and 800 g of NMP are mixed, and the mixture is heated to 60° C. and stirred. Powder in which 117.28 g (0.399 mol) of BPDA and 1.50 g (0.010 mol) of PA, each in the form of a powder, are mixed is gradually added over 30 minutes. Thereafter, a polymerization reaction is performed at 60° C. for 24 hours under stirring. Thereafter, the resultant solution is filtered through a #800 stainless steel mesh to obtain a polyamic acid solution. In the above process, Y/X=BPDA molar amount/ODA molar amount=0.966, and Z/2(X−Y)=PA molar amount/2 (ODA molar amount−BPDA molar amount)=0.36. The imidization ratio is measured by the above-described method. The results are shown in Table 1.

Production Examples A2 to A15 and B1 to B12

Polyamic acid solutions are obtained in the same manner as in Production Example A1, except changing the molar ratios of the diamine compound, the tetracarboxylic acid dianhydride, and the acid monoanhydride to the molar ratios shown in Table 1 and Table 2. The imidization ratio is measured by the above-described method. The results are shown in Table 1 and Table 2.

Production Example C1

In a 1 L separable flask, 81.50 g (0.407 mol) of ODA and 800 g of NMP are mixed, and the mixture is heated to 60° C. and stirred. Powder in which 118.57 g (0.403 mol) of BPDA and 0.59 g (0.004 mol) of PA, each in the form of a powder, are mixed is gradually added over 30 minutes. Thereafter, a polymerization reaction is performed at 60° C. for 24 hours under stirring. Thereafter, the resulting solution is filtered through a #800 stainless steel mesh to obtain a polyamic acid solution. In the above process, Y/X=BPDA molar amount/ODA molar amount=0.990, and Z/2(X−Y)=PA molar amount/2 (ODA molar amount−BPDA molar amount)=0.50. The imidization ratio is measured by the above-described method. The results are shown in Table 3.

Production Example C2

A polyamic acid solution is obtained in the same manner as in Production Example C1, except changing the heating temperature at the time of a polymerization reaction to 75° C. The results are shown in Table 3.

Example 1

60 g of SB4 is added to 1000 g of the polyamic acid solution (containing 200 g of a polyamic acid) of production example A1, and then conductive carbon black is dispersed therein by the above-described method. The evaluation results of the polyamic acid composition are shown in Table 4.

A polyimide endless belt is produced by the above-described method using this polyamic acid composition. The evaluation results thereof are shown in Table 4.

Examples 2 to 22 and Comparative Examples 1 to 16

Polyamic acid compositions and polyimide endless belts are obtained in the same manner as in Example 1, except using the polyamic acid solutions and conductive carbon blacks shown in Tables 4 to 7 at quantitative ratios shown in Tables 4 to 7. The evaluation results are shown in Tables 4 to 7.

Evaluation

—Evaluation of Stability of Polyamic Acid Composition (Change in Viscosity(%))—

10 g of a polyamic acid solution is weighed, sealed in a 50 ml sample bottle, and then left at 23° C.±5° C. for 30 days. The viscosity is measured by the method (1) above. The change in viscosity is represented by the equation: Change in viscosity (%)=(Viscosity after the polyamic acid solution is left for 30 days)/(Viscosity immediately after preparation of the polyamic acid solution)×100. A change closer to 100% indicates a better stability of the polyamic acid composition.

—Tensile Test of Polyimide Endless Belt (Modulus of Elasticity, Strength, Elongation)—

Measurement is performed according to JIS-K7127 (1987) using a tensile tester 1605N manufactured by Aikoh Engineering Co., Ltd. wherein the distance between the chucks is 20 mm and the tensile rate is 20 nm min. A strip of 5 mm×40 mm is cut out from the polyimide endless belt and used as a sample for measurement.

—MIT Test of Polyimide Endless Belt Folding Endurance)—

A test piece is subjected to a two-way folding test according to JIS-C5016 (1994) using an MIT folding endurance tester manufactured by Yasuda Seiki Seisakusho LTD. under the conditions of a tensile load of 1.0 kg and a folding angle of 135°. The test piece for measurement is a strip of 150 mm×15 mm cut out from the polyimide endless belt.

—In-Plane Variation of Surface Resistivity of Polyimide Endless Belt—

A 100 V voltage is applied using a UR probe of HIGH RESTER IP, manufactured by Mitsubishi Yuka Co., Ltd. (outer diameter Φ of a cylindrical electrode: 16 mm, inner diameter Φ of a ring-shaped electrode: 30 mm, outer diameter Φ of the ring-shaped electrode: 40 mm) under an environment of 22±3° C. and 50±5% RH. Then, the electric resistance of the belt 30 milliseconds after the application of the voltage and the electric resistance of the belt 10 seconds after the application of the voltage are measured. Based on the measurement values, the common logarithm value (ρs (30 msec)) of the surface resistivity measured at 30 millisecond after the application of the voltage and the common logarithm value (ρs (10 sec)) of the surface resistivity measured at 10 seconds after the application of the voltage are calculated. Moreover, Δ=|ρs (30 msec)−ρs(10 sec)| is calculated. Less in-plane variation of the surface resistivity indicates better electrical properties.

Example 23

300 g of SB4 is added to 2,000 g of the polyamic acid solution of Production Example A3, and then conductive carbon black is dispersed therein by the above-described method. Thereafter, 3,500 g of the polyamic acid solution of Production Example A12 is further added thereto and mixed to obtain a polyamic acid composition. Further, a polyimide endless belt having a thicknesses of 80 μm is produced according to the above-described method of producing a polyimide endless belt. Evaluation is performed according to the following evaluation of printed image quality. The evaluation results are shown in Table 8.

Examples 24 and 25 and Comparative Examples 17 and 18

Polyamic acid compositions and polyimide endless belts are obtained in the same manner as in Example 23, except for using the polyamic acid solutions shown in Table 8. The evaluation results are shown in Table 8.

Evaluation
—Evaluation of Quality of Printed Image Formed Using Polyimide Endless Belt—
A polyimide endless belt having a thickness of 80 μm in which the common logarithm value of the surface resistivity is from 11.0 to 11.5 (Log Ω/sq) are evaluated for the following evaluation items as initial properties.

Using DocuCentre Color 2220 manufactured by Fuji Xerox Co., Ltd. (modified machine; modified to have a processing rate of 250 mm/sec and a primary transfer current of 35 μA) in which the obtained polyimide endless belt is mounted as an intermediate transfer belt, 50% halftone images of cyan and magenta are printed on sheets of C2 paper manufactured by Fuji Xerox Co., Ltd. under each of high humidity and high temperature (28° C., 85% R) and low humidity and low temperature (10° C., 15% RH). Then, concentration unevenness and spot defects are visually evaluated according to the following criteria.

Concentration Unevenness
A printed area of 10th printed sample sheet is evenly divided into 9 regions (3×3=9). Then, the chromaticity of each divided region is measured using a chromaticity meter CR-210 (manufactured by Minolta Co., Ltd.) to determine a color difference ΔE which is a difference between the maximum chromaticity and the minimum chromaticity.
A: Color difference ΔE is less than 0.3. (Concentration unevenness is not observed).
B: Color difference ΔE is 0.3 or more but less than 1.0.
C: Color difference ΔE is 1.0 or more.

Spot Defect
Spots in a printed area of the 10th printed sample sheet are visually observed, and evaluated according to the following criteria.
A: The number of spots having a size of smaller than 0.5 mm is fewer than 10.
B: The number of spots having a size of smaller than 0.5 mm is 10 or more but fewer than 50.
C: (i) The number of spots having a size of smaller than 0.5 mm is 50 or more or (ii) spots having a size of from 0.5 mm to less than 1.0 mm occur but the number thereof is fewer than 50, and spots having a size of 1.0 mm or more do not occur.

TABLE 1

| | | Production Examples | | | | | | | |
|---|---|---|---|---|---|---|---|---|---|
| | | A1 | A2 | A3 | A4 | A5 | A6 | A7 | A8 |
| Diamine compound | Type | ODA | ODA | ODA | ODA | ODA | ODA | ODA | ODA |
| | X[mol] | 0.413 | 0.413 | 0.412 | 0.412 | 0.412 | 0.408 | 0.408 | 0.408 |
| Tetracarboxylic acid dianhydride | Type | BPDA | BPDA | BPDA | BPDA | BPDA | BPDA | BPDA | BPDA |
| | Y[mol] | 0.399 | 0.399 | 0.399 | 0.399 | 0.399 | 0.402 | 0.402 | 0.402 |
| Acid monoanhydride | Type | PA | PA | PA | PA | PA | PA | PA | PA |
| | Z[mol] | 0.010 | 0.022 | 0.009 | 0.012 | 0.019 | 0.004 | 0.005 | 0.006 |
| Y/X | | 0.966 | 0.966 | 0.968 | 0.968 | 0.968 | 0.985 | 0.985 | 0.985 |
| Z/2(X − Y) | | 0.36 | 0.79 | 0.35 | 0.46 | 0.73 | 0.33 | 0.42 | 0.50 |
| Viscosity [Pa · S] | | 3.2 | 2.5 | 7.9 | 7.0 | 6.5 | 58.2 | 50.3 | 39.6 |
| Imidization ratio [%] | | 4.1 | 4.2 | 4.1 | 4.6 | 4.6 | 4.7 | 4.7 | 4.8 |

| | | Production Examples | | | | | | |
|---|---|---|---|---|---|---|---|---|
| | | A9 | A10 | A11 | A12 | A13 | A14 | A15 |
| Diamine compound | Type | ODA | ODA | ODA | ODA | ODA | ODA | ODA |
| | X[mol] | 0.408 | 0.408 | 0.407 | 0.407 | 0.407 | 0.406 | 0.406 |
| Tetracarboxylic acid dianhydride | Type | BPDA | BPDA | BPDA | BPDA | BPDA | BPDA | BPDA |
| | Y[mol] | 0.402 | 0.403 | 0.402 | 0.403 | 0.403 | 0.404 | 0.404 |
| Acid monoanhydride | Type | PA | PA | PA | PA | PA | PA | PA |
| | Z[mol] | 0.007 | 0.009 | 0.003 | 0.004 | 0.006 | 0.001 | 0.002 |
| Y/X | | 0.985 | 0.985 | 0.990 | 0.990 | 0.990 | 0.995 | 0.995 |
| Z/2(X − Y) | | 0.58 | 0.75 | 0.38 | 0.50 | 0.75 | 0.25 | 0.50 |
| Viscosity [Pa · S] | | 42.3 | 39.5 | 73.5 | 60.9 | 55.4 | 99.6 | 84.1 |
| Imidization ratio [%] | | 4.8 | 4.8 | 6.8 | 6.9 | 7.2 | 7.3 | 7.4 |

TABLE 2

| | | Production Examples | | | | | | | | | | | |
|---|---|---|---|---|---|---|---|---|---|---|---|---|---|
| | | B1 | B2 | B3 | B4 | B5 | B6 | B7 | B8 | B9 | B10 | B11 | B12 |
| Diamine compound | Type | ODA | ODA | ODA | ODA | ODA | ODA | ODA | ODA | ODA | ODA | ODA | ODA |
| | X[mol] | 0.414 | 0.414 | 0.399 | 0.399 | 0.399 | 0.399 | 0.408 | 0.408 | 0.408 | 0.408 | 0.405 | 0.405 |
| Tetracarboxylic acid dianhydride | Type | BPDA | BPDA | BPDA | BPDA | BPDA | BPDA | BPDA | BPDA | BPDA | BPDA | BPDA | BPDA |
| | Y[mol] | 0.398 | 0.398 | 0.387 | 0.387 | 0.387 | 0.387 | 0.402 | 0.402 | 0.402 | 0.402 | 0.404 | 0.404 |
| Acid monoanhydride | Type | — | PA | — | PA | PA | PA | — | PA | PA | PA | — | PA |
| | Z[mol] | | 0.017 | | 0.004 | 0.021 | 0.025 | | 0.002 | 0.010 | 0.012 | | 0.001 |
| Y/X | | 0.961 | 0.961 | 0.970 | 0.970 | 0.970 | 0.970 | 0.985 | 0.985 | 0.985 | 0.985 | 0.998 | 0.998 |
| Z/2(X − Y) | | 0.00 | 0.53 | 0.00 | 0.17 | 0.87 | 1.04 | 0.00 | 0.17 | 0.83 | 1.00 | 0.00 | 0.50 |
| Viscosity [Pa · S] | | 3.0 | 2.8 | 7.4 | 7.4 | 7.0 | 6.8 | 75.6 | 70.3 | 40.2 | 35.1 | — | — |
| Imidization ratio [%] | | 5.1 | 5.0 | 5.1 | 5.0 | 4.3 | 4.2 | 6.0 | 5.6 | 4.8 | 4.5 | 9.2 | 8.7 |

(*) "—" in the row for viscosity indicates that the viscosity is unmeasurable since required torque is too strong.

TABLE 3

| | | Production Examples | |
|---|---|---|---|
| | | C1 | C2 |
| Diamine compound | Type | ODA | ODA |
| | X [mol] | 0.407 | 0.407 |
| Tetracarboxylic acid dianhydride | Type | BPDA | BPDA |
| | Y [mol] | 0.403 | 0.403 |
| Acid monoanhydride | Type | PA | PA |
| | Z [mol] | 0.004 | 0.004 |
| Y/X | | 0.990 | 0.990 |
| Z/2 (X − Y) | | 0.50 | 0.50 |
| Viscosity [Pa · S] | | 61.2 | 42.5 |
| Imidization ratio [%] | | 8.1 | 22.4 |

TABLE 4

| | | Examples | | | | | | | |
|---|---|---|---|---|---|---|---|---|---|
| | | 1 | 2 | 3 | 4 | 5 | 6 | 7 | 8 |
| Polyamic acid solution | Production Example | A1 | A2 | A3 | A4 | A5 | A6 | A7 | A8 |
| | [g] | 1000 | 1000 | 1000 | 1000 | 1000 | 1000 | 1000 | 1000 |
| Conductive carbon black | Type | SB4 | SB4 | SB4 | SB4 | SB4 | SB4 | SB4 | SB4 |
| | [g] | 60 | 60 | 60 | 60 | 60 | 60 | 60 | 60 |
| Mass ratio of Conductive carbon black to Polyamic acid | [%] | 30 | 30 | 30 | 30 | 30 | 30 | 30 | 30 |
| Change in viscosity [%] | | 140 | 122 | 142 | 133 | 123 | 145 | 140 | 132 |
| Tensile elasticity [Mpa] | | 3810 | 3590 | 3790 | 3750 | 3610 | 3630 | 3610 | 3590 |
| Tensile strength [Mpa] | | 210 | 180 | 205 | 200 | 180 | 182 | 180 | 177 |
| Tensile elongation [%] | | 46 | 38 | 45 | 47 | 40 | 41 | 40 | 39 |
| MIT folding endurance test [number of times] | | 1110 | 1150 | 950 | 890 | 560 | 2450 | 2390 | 2040 |
| In-plane variation of surface resistivity (±) | | 0.3 | 0.3 | 0.4 | 0.4 | 0.3 | 0.2 | 0.2 | 0.3 |

| | | Examples | | | | | | |
|---|---|---|---|---|---|---|---|---|
| | | 9 | 10 | 11 | 12 | 13 | 14 | 15 |
| Polyamic acid solution | Production Example | A9 | A10 | A11 | A12 | A13 | A14 | A15 |
| | [g] | 1000 | 1000 | 1000 | 1000 | 1000 | 1000 | 1000 |
| Conductive carbon black | Type | SB4 | SB4 | SB4 | SB4 | SB4 | SB4 | SB4 |
| | [g] | 60 | 60 | 60 | 60 | 60 | 60 | 60 |
| Mass ratio of Conductive carbon black to Polyamic acid | [%] | 30 | 30 | 30 | 30 | 30 | 30 | 30 |
| Change in viscosity [%] | | 129 | 125 | 130 | 125 | 121 | 143 | 138 |
| Tensile elasticity [Mpa] | | 3670 | 3540 | 3570 | 3560 | 3510 | 3530 | 3520 |
| Tensile strength [Mpa] | | 175 | 170 | 175 | 170 | 170 | 170 | 165 |
| Tensile elongation [%] | | 38 | 30 | 35 | 31 | 27 | 25 | 25 |
| MIT folding endurance test [number of times] | | 1910 | 1880 | 2660 | 2580 | 2490 | 2900 | 2910 |

TABLE 4-continued

| | | | | | | | |
|---|---|---|---|---|---|---|---|
| In-plane variation of surface resistivity (±) | 0.2 | 0.2 | 0.2 | 0.3 | 0.3 | 0.3 | 0.2 |

TABLE 5

| | | Examples | | | |
|---|---|---|---|---|---|
| | | 16 | 17 | 18 | 19 |
| Polyamic acid solution | Production Example | C1 | C2 | C1 | C1 |
| | [g] | 1000 | 1000 | 1000 | 1000 |
| Conductive carbon black | Type | SB4 | SB4 | SB4 | SB4 |
| | [g] | 60 | 60 | 20 | 150 |
| Mass ratio of Conductive carbon black to Polyamic acid | [%] | 30 | 30 | 10 | 75 |
| Change in viscosity [%] | | 140 | 122 | 107 | 180 |
| Tensile elasticity [Mpa] | | 3550 | 3620 | 3220 | 4500 |
| Tensile strength [Mpa] | | 170 | 170 | 150 | 260 |
| Tensile elongation [%] | | 31 | 30 | 55 | 12 |
| MIT folding endurance test [number of times] | | 2510 | 2490 | 5300 | 560 |
| In-plane variation of surface resistivity (±) | | 0.3 | 0.4 | 0.3 | 0.2 |

TABLE 6

| | | Comparative Examples | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| Polyamic acid solution | Production Example | B1 | B2 | B3 | B4 | B5 | B6 | B7 | B8 | B9 | B10 | B11 | B12 |
| | [g] | 1000 | 1000 | 1000 | 1000 | 1000 | 1000 | 1000 | 1000 | 1000 | 1000 | 1000 | 1000 |
| Conductive carbon black | Type | SB4 | SB4 | SB4 | SB4 | SB4 | SB4 | SB4 | SB4 | SB4 | SB4 | SB4 | SB4 |
| | [g] | 60 | 60 | 60 | 60 | 60 | 60 | 60 | 60 | 60 | 60 | 60 | 60 |
| Mass ratio of Conductive carbon black to Polyamic acid | [%] | 30 | 30 | 30 | 30 | 30 | 30 | 30 | 30 | 30 | 30 | 30 | 30 |
| Change in viscosity [%] | | 210 | 143 | 202 | 183 | 120 | 115 | 199 | 188 | 133 | 122 | *1 | *1 |
| Tensile elasticity [Mpa] | | 3920 | 3750 | 3860 | 3820 | 3570 | 3570 | 3680 | 3650 | 3510 | 3478 | | |
| Tensile strength [Mpa] | | 160 | 200 | 230 | 210 | 175 | 175 | 190 | 185 | 165 | 160 | | |
| Tensile elongation [%] | | 19 | 39 | 20 | 41 | 34 | 35 | 45 | 41 | 22 | 12 | | |
| MIT folding endurance test [number of times] | | 820 | 650 | 930 | 880 | 310 | 210 | 2680 | 2330 | 620 | 330 | | |
| In-plane variation of surface resistivity (±) | | 0.5 | 0.6 | 0.5 | 0.5 | 1.1 | 1.3 | 0.4 | 0.4 | 0.5 | 0.9 | | |

(*1) Unable to disperse due to mechanical limit because viscosity of the polyamic acid solution is excessively high

TABLE 7

| | | Examples | | | Comparative Examples | | | |
|---|---|---|---|---|---|---|---|---|
| | | 20 | 21 | 22 | 13 | 14 | 15 | 16 |
| Polyamic acid solution | Production Example | A4 | A8 | A12 | B3 | B6 | B7 | B10 |
| | [g] | 1000 | 1000 | 1000 | 1000 | 1000 | 1000 | 1000 |
| Conductive carbon black | Type | EC | EC | EC | EC | EC | EC | EC |
| | [g] | 60 | 60 | 60 | 60 | 60 | 60 | 60 |
| Mass ratio of Conductive carbon black to Polyamic acid | [%] | 30 | 30 | 30 | 30 | 30 | 30 | 30 |
| Change in viscosity [%] | | 111 | 120 | 122 | 130 | 142 | 135 | 144 |
| Tensile elasticity [Mpa] | | 3620 | 3650 | 3590 | 3500 | 3450 | 3450 | 3400 |
| Tensile strength [Mpa] | | 220 | 225 | 230 | 160 | 170 | 170 | 155 |
| Tensile elongation [%] | | 34 | 35 | 38 | 32 | 35 | 35 | 32 |
| MIT folding endurance test [number of times] | | 300 | 1200 | 1520 | 1220 | 1500 | 1030 | 1410 |
| In-plane variation of surface resistivity (±) | | 0.6 | 0.6 | 0.6 | 1.2 | 1.3 | 1.0 | 1.2 |

TABLE 8

|  |  | Examples | | | Comparative Examples | |
| --- | --- | --- | --- | --- | --- | --- |
|  |  | 23 | 24 | 25 | 17 | 18 |
| Polyamic acid solution | Production Example | A3 | A4 | A5 | B3 | B5 |
|  | [g] | 2000 | 2000 | 2000 | 2000 | 2000 |
| Conductive carbon black | Type | SB4 | SB4 | SB4 | SB4 | SB4 |
|  | [g] | 300 | 300 | 300 | 300 | 300 |
| Polyamic acid solution | Production Example | A12 | A12 | A12 | B7 | B10 |
|  | [g] | 3500 | 3500 | 3500 | 3500 | 3500 |
| Mass ratio of Conductive carbon black to Total of Polyamic acids | [%] | 27.2 | 27.2 | 27.1 | 27.5 | 27.3 |
| Common logarithm value (Log(Ω/sq) of surface resistivity |  | 11.1 | 11.0 | 10.8 | 9.8 | 10.2 |
| Concentration unevenness | Evaluation | A | A | A | B | C |
| Spot defect | Evaluation | A | A | A | B | C |

What is claimed is:

1. A partially imidized polyamic acid composition comprising:
a conductive carbon black; and
a partially imidized polyamic acid obtained by a polymerization and imidization reaction of a diamine compound, a tetracarboxylic acid dianhydride, and an acid monoanhydride at a quantitative ratio satisfying the following Relational Expression (1) and Relational Expression (2):

$$0.962 \le Y/X \le 0.997 \qquad \text{Relational Expression (1)}$$

$$0.20 \le Z/2(X-Y) < 0.80 \qquad \text{Relational Expression (2)}$$

wherein,
in Relational Expressions (1) and (2), X represents a content by mol of the diamine compound, Y represents a content by mol of the tetracarboxylic acid dianhydride, and Z represents a content by mol of the acid monoanhydride,
the partially imidized polyamic acid has an imidization ratio of from 4.1% to 25.0%, and
a main molecular skeleton of the polyamic acid is represented by the following Formula (1):

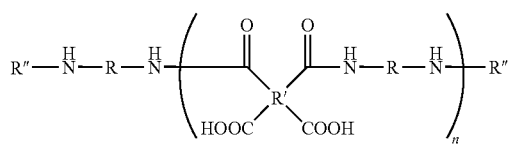

Formula (1)

wherein:

R is selected from any one of the following divalent aromatic residues:

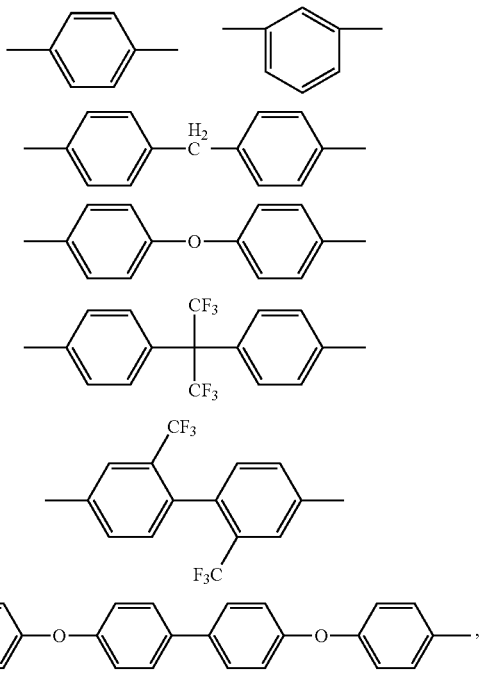

R' represents a tetravalent aromatic residue or a tetravalent aliphatic residue, n represents a positive number, and R" represents a terminal of a molecule and is selected from hydrogen or an organic group formed by the acid monoanhydride.

2. The partially imidized polyamic acid composition according to claim 1, wherein the diamine compound is at least one selected from p-phenylenediamine or 4,4'-diaminodiphenyl ether.

3. The partially imidized polyamic acid composition according to claim 1, wherein the tetracarboxylic acid dianhydride is at least one selected from pyromellitic acid dianhydride or 3,3',4,4'-benzophenone tetracarboxylic acid dianhydride.

4. The partially imidized polyamic acid composition according to claim 1, wherein the acid monoanhydride is at least one selected from maleic anhydride or phthalic anhydride.

5. The partially imidized polyamic acid composition according to claim 1, wherein the main molecular skeleton of the polyamic acid is represented by one of the following formulae:

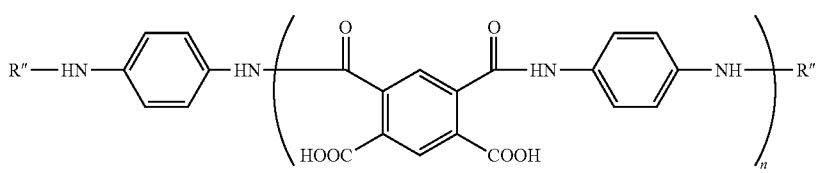

-continued

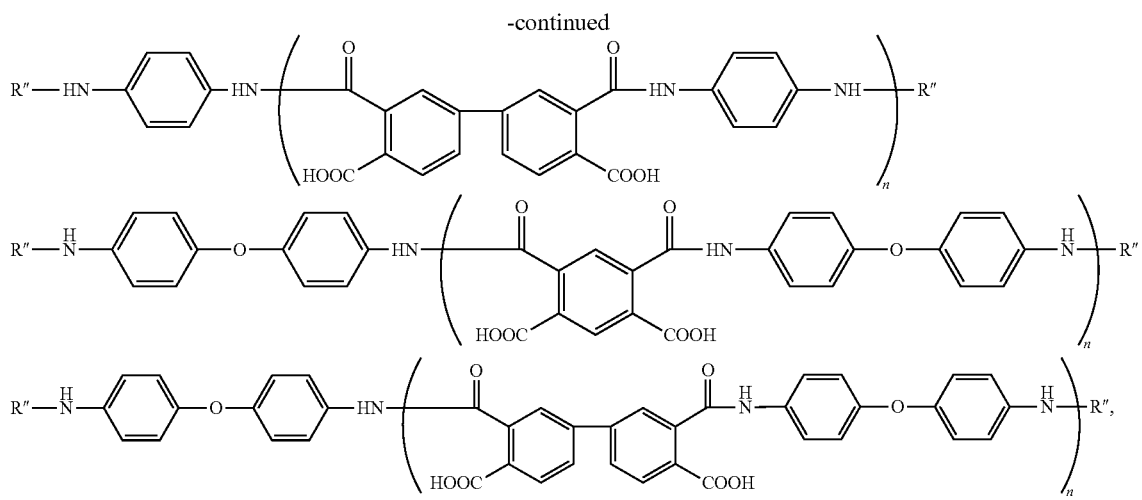

wherein, in the formulae, n represents a positive number and R″ represents a terminal of a molecule and is selected from hydrogen or an organic group formed by the acid monoanhydride.

6. The partially imidized polyamic acid composition according to claim 1, wherein the imidization ratio of the partially imidized polyamic acid is from 4.1% to 15.0%.

7. The partially imidized polyamic acid composition according to claim 1, wherein the imidization ratio of the partially imidized polyamic acid is from 4.1% to 10.0%.

8. The partially imidized polyamic acid composition according to claim 1, wherein a pH of the conductive carbon black is 7 or less.

9. A polyimide endless belt, which is formed by the steps of:

applying the partially imidized polyamic acid composition according to claim 1 to a surface of a cylindrical base material; and converting the partially imidized polyamic acid contained in the partially imidized polyamic acid composition applied to the surface of the cylindrical base material to an imide.

10. An image forming apparatus comprising the polyimide endless belt according to claim 9.

11. The partially imidized polyamic acid composition according to claim 1, wherein the diamine compound is p-phenylenediamine.

* * * * *